US009531693B1

(12) United States Patent
Chin et al.

(10) Patent No.: US 9,531,693 B1
(45) Date of Patent: *Dec. 27, 2016

(54) AUDITABLE RETRIEVAL OF PRIVILEGED CREDENTIALS

(71) Applicant: International Business Machines Corporation, Armonk, NY (US)

(72) Inventors: Kelvin K. V. Chin, Singapore (SG); Chee Meng Low, Singapore (SG); Vivek Shankar, Singapore (SG); Edwin B. Soenaryo, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,055

(22) Filed: Jun. 21, 2016

Related U.S. Application Data

(63) Continuation of application No. 14/979,970, filed on Dec. 28, 2015, now Pat. No. 9,391,996, which is a continuation of application No. 14/872,502, filed on Oct. 1, 2015.

(51) Int. Cl.

| | |
|---|---|
| *G06F 7/04* | (2006.01) |
| *G06F 17/30* | (2006.01) |
| *H04N 7/16* | (2011.01) |
| *G06F 12/00* | (2006.01) |
| *G06F 12/14* | (2006.01) |
| *G06F 13/00* | (2006.01) |
| *G11C 7/00* | (2006.01) |
| *H04L 29/06* | (2006.01) |

(52) U.S. Cl.
CPC ....... *H04L 63/062* (2013.01); *G06F 17/30861* (2013.01); *H04L 63/083* (2013.01); *G06F 17/30575* (2013.01); *H04L 63/0884* (2013.01)

(58) Field of Classification Search
CPC ............ H04L 63/0807; H04L 63/0884; H04L 63/108; G06F 11/2089; G06F 11/2005; G06F 17/30575; G06F 21/45
See application file for complete search history.

(56) References Cited

U.S. PATENT DOCUMENTS

| | | |
|---|---|---|
| 7,376,838 B2 | 5/2008 | Narayanan |
| 8,205,098 B2 | 6/2012 | Malpani |
| 8,631,478 B2 | 1/2014 | Chen et al. |

(Continued)

OTHER PUBLICATIONS

Hitachi, "Best Practices for Securing Privileged Accounts", Applicant's submitted art.*

(Continued)

*Primary Examiner* — Andrew Nalven
*Assistant Examiner* — Quy Pham
(74) *Attorney, Agent, or Firm* — Edward J. Wixted, III (57) ABSTRACT

In an approach for providing auditable retrieval of privileged credentials in a privilege identity management (PIM) system, a processor invokes a checkout of a PIM credential, based on, at least, a determination that a PIM server cannot be accessed. A processor receives a request to access the PIM credential by a user. A processor receives validation of the request to access the PIM credential and an identity of the user. A processor retrieves the PIM credential from a database, wherein the database stores a plurality of PIM credentials owned by a system owner.

1 Claim, 4 Drawing Sheets

(56) References Cited

U.S. PATENT DOCUMENTS

| | | | |
|---|---|---|---|
| 8,997,195 B1 * | 3/2015 | Fadida | H04L 63/083 705/2 |
| 9,129,120 B2 | 9/2015 | Garcia et al. | |
| 9,152,783 B2 | 10/2015 | Kottahachchi et al. | |
| 9,391,996 B1 | 7/2016 | Chin et al. | |
| 2008/0077809 A1 * | 3/2008 | Hayler | G06F 12/1466 713/193 |
| 2012/0266228 A1 * | 10/2012 | Dash | G06F 21/41 726/8 |
| 2013/0086628 A1 * | 4/2013 | Kottahachchi | G06F 21/45 726/1 |
| 2013/0086658 A1 | 4/2013 | Kottahachchi et al. | |
| 2013/0232541 A1 | 9/2013 | Kapadia et al. | |

OTHER PUBLICATIONS

"ManageEngine Password Manager Pro-Release Notes"; ManageEngine; pp. 1 to 28; Printed Apr. 7, 2015; <https://www.manageengine.com/products/passwordmanagerpro/release-notes.html>.

"Privileged Identity Management with CA ControlMinder"; CA technologies; pp. 1 to 27.

List of IBM Patents or Patent Applications Treated As Related; Dated Sep. 16, 2016; 2 pages.

U.S. Appl. No. 14/872,502, filed Oct. 1, 2015; Entitled "Auditable Retrieval of Privileged Credentials".

* cited by examiner

FIG. 5

AUDITABLE RETRIEVAL OF PRIVILEGED CREDENTIALS

BACKGROUND

The present invention relates generally to the field of identity management, and more particularly to providing auditable retrieval of privileged credentials in a privilege identity management (PIM) system when a user is unable to checkout credentials from a PIM server.

In computing, identity management describes the management of individual principals (i.e., digital identities), the principals' authentication and authorization, and privileges within or across system and enterprise boundaries. Identity management has a goal of increasing security and productivity while decreasing cost, downtime, and repetitive tasks.

PIM is a domain within identity management, focused on the special requirements of powerful accounts within the information technology (IT) infrastructure of an enterprise. PIM is frequently used as an information security and governance tool to help companies in meeting compliance regulations and to prevent internal data breaches through the use of privileged accounts. The management of privileged identities can be automated to follow predetermined or customized policies and requirements for an organization or industry.

SUMMARY

Aspects of an embodiment of the present invention disclose a method, computer program product, and computer system for providing auditable retrieval of privileged credentials in a privilege identity management (PIM) system. A processor invokes a checkout of a PIM credential, based on, at least, a determination that a PIM server cannot be accessed. A processor receives a request to access the PIM credential by a user. A processor receives validation of the request to access the PIM credential and an identity of the user. A processor retrieves the PIM credential from a database, wherein the database stores a plurality of PIM credentials owned by a system owner.

DETAILED DESCRIPTION

Currently, privilege identity management (PIM) software generally involves three types of users: PIM administrator, system owner, and privileged user. The PIM administrator is responsible for overall setup/maintenance of the system. The system owner is responsible for onboarding the shared IDs into the credential vault and setting up access policies. The privileged user is a user who will need occasional access to certain credentials to access certain systems to perform specific privileged tasks for a limited period of time.

Typically, PIM software offers a Check In/Check Out (CICO) facility for a privileged user to checkout a credential (possibly after going through an approval workflow) to use for a limited period of time, and to check in the credential when the user is done. The PIM system maintains an audit log of which user has checked out which credential over which period of time, so that actions performed using that shared ID on the managed system can be linked to the actual user whenever required.

Advanced PIM software may support single sign-on (SSO), relying on an SSO agent running on the user's machine, or on a gateway machine, to automatically check out required credentials from the PIM server, and to auto logon with such credentials to the target system so the user is automatically logged into a remote session to the managed system. When the user terminates the session, the SSO agent automatically checks in the credentials to the PIM server.

Embodiments of the present invention recognize the concern of organizations using PIM systems over a heavy dependency on the PIM system. Additionally, embodiments of the present invention recognize users have no means to retrieve the required credentials to access various systems if the PIM server is down and attempts for immediate recovery fails. Embodiments of the present invention recognize that providing an auditable retrieval of privileged credentials in a PIM system when a user is unable to checkout credentials from a PIM server will allow organizations to have less of a dependency on the PIM system.

Embodiments of the present invention will now be described in detail with reference to the Figures.

Figure 1:
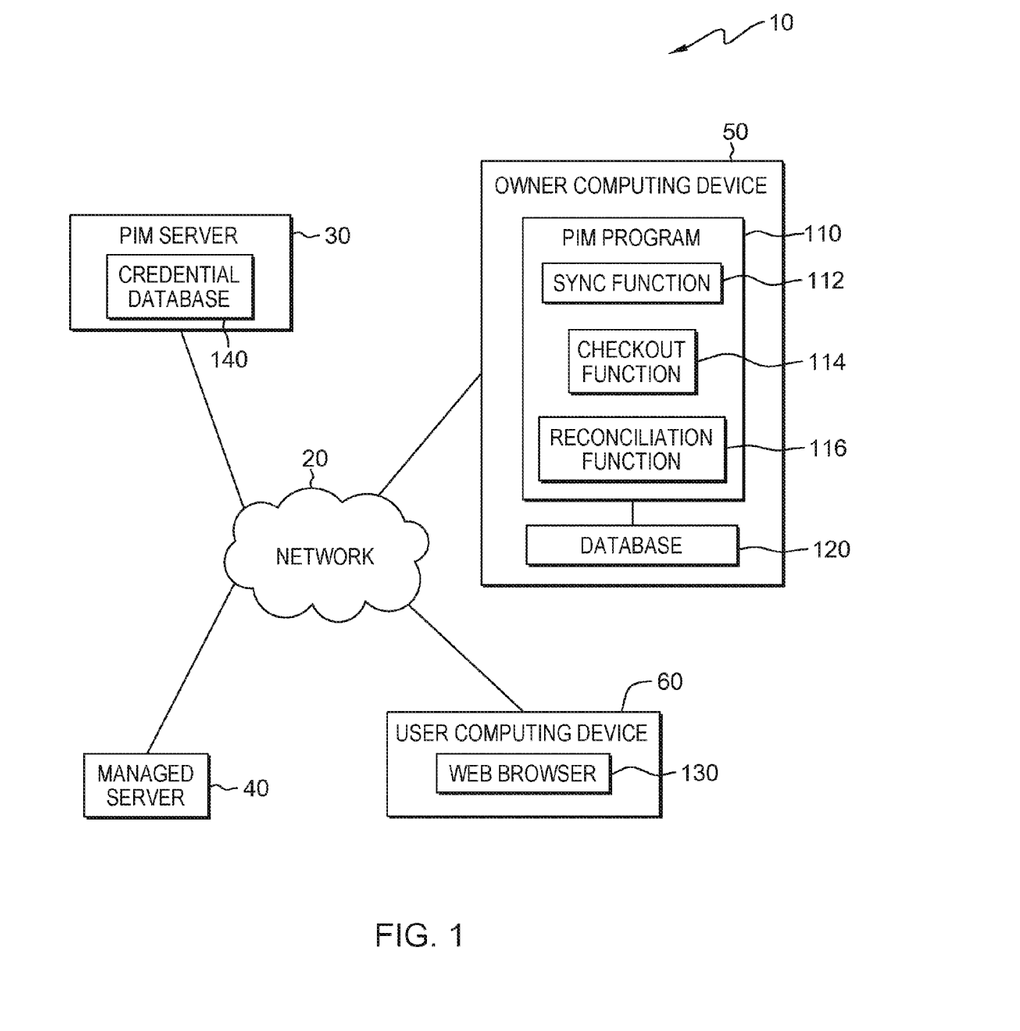
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes PIM server 30, managed server 40, owner computing device 50, and user computing device 60 interconnected over network 20. Network 20 may be a local area network (LAN), a wide area network (WAN) such as the Internet, a cellular data network, any combination thereof, or any combination of connections and protocols that will support communications between PIM server 30, managed server 40, owner computing device 50, and user computing device 60, in accordance with embodiments of the invention. Network 20 may include wired, wireless, or fiber optic connections. Computing system 10 may include additional computing devices, servers, or other devices not shown.

PIM server 30 may be a management server, a web server, or any other electronic device or computing system capable of processing program instructions and receiving and sending data. In some embodiments, PIM server 30 may be a laptop computer, tablet computer, netbook computer, personal computer (PC), a desktop computer, or any programmable electronic device capable of communicating with managed server 40, owner computing device 50 and user computing device 60 via network 20. In other embodiments, PIM server 30 may represent a server computing system utilizing multiple computers as a server system, such as in a cloud computing environment. In another embodiment, PIM server 30 represents a computing system utilizing clustered computers and components to act as a single pool of seamless resources. In the depicted embodiment, PIM server 30 contains credential database 140. In other embodiments, PIM server 30 may include other components, as depicted and described in further detail with respect to FIG. 5.

Managed server 40 may be a management server, a web server, or any other electronic device or computing system capable of processing program instructions and receiving and sending data. In some embodiments, managed server 40 may be a laptop computer, tablet computer, netbook computer, personal computer (PC), a desktop computer, or any programmable electronic device capable of communicating with PIM server 30, owner computing device 50 and user computing device 60 via network 20. In other embodiments, managed server 40 may represent a server computing system utilizing multiple computers as a server system, such as in a cloud computing environment. In another embodiment, managed server 40 represents a computing system utilizing clustered computers and components to act as a single pool of seamless resources. In some embodiments, managed server 40 contains various managed systems (not shown) that allow users to perform specific privileged tasks for a limited period of time. In other embodiments, managed server 40 may include other components, as depicted and described in further detail with respect to FIG. 5.

Owner computing device 50 may be a desktop computer, laptop computer, netbook computer, or tablet computer. In general, owner computing device 50 may be any electronic device or computing system capable of processing program instructions, sending and receiving data, and communicating with PIM server 30, managed server 40 and user computing device 60 via network 20. In the depicted embodiment, owner computing device 50 contains PIM program 110, sync function 112, checkout function 114, reconciliation function 116, and database 120. In other embodiments, owner computing device 50 may include other components, as depicted and described in further detail with respect to FIG. 5.

User computing device 60 may be a desktop computer, laptop computer, netbook computer, or tablet computer. In general, user computing device 60 may be any electronic device or computing system capable of processing program instructions, sending and receiving data, and communicating with PIM server 30, managed server 40 and owner computing device 50 via network 20. Additionally, user computing device 60 may host a remote access application, such as a remote desktop protocol (RDP) or secure shell (SSH) client, which a user will use, with credentials checked out and retrieved from PIM server 30 (via a web browser 130), to logon to a remote system. In the depicted embodiment, user computing device 60 contains web browser 130. In other embodiments, user computing device 60 may include other components, as depicted and described in further detail with respect to FIG. 5.

PIM program 110 provides auditable retrieval of privileged credentials in a privileged identity management (PIM) system when a user is unable to checkout credentials from a PIM server. In doing so, PIM program 110 registers with PIM server 30. PIM program 110 requests and secures credentials. PIM program 110 determines to invoke a checkout because a user is unable to checkout credentials from PIM server 30. PIM program 110 receives a request to access credentials. PIM program 110 receives validation of request and identity. PIM program 110 retrieves credentials. PIM program 110 generates an audit for the checkout. PIM program 110 determines that the user is able to checkout credentials from PIM server 30. PIM program 110 submits the audit to PIM server 30. PIM program 110 receives notification of the reconciliation process. PIM program 110 receives notification of check in and change of password. In the depicted embodiment, PIM program 110 resides on owner computing device 50. In other embodiments, PIM program 110 may reside on another computing device or server, provided that PIM program 110 can access database 120, PIM server 30, and credential database 140 via network 20.

Sync function 112 synchronizes any updated credentials from PIM server 30. The updated credentials may be stored to database 120. In the depicted embodiment, sync function 112 is a function of PIM program 110. In other embodiments, sync function 112 may be a separate program accessible by PIM program 110.

Checkout function 114 performs a checkout process on behalf of a user at a disconnected site. The checkout allows the user to obtain credentials at a disconnected site. In the depicted embodiment, checkout function 114 is a function of PIM program 110. In other embodiments, checkout function 114 may be a separate program accessible by PIM program 110.

Reconciliation function 116 performs a post-checkout reconciliation process, which seeks to check in the credentials and change the password for future use. In the depicted embodiment, reconciliation function 116 is a function of PIM program 110. In other embodiments, reconciliation function 116 may be a separate program accessible by PIM program 110.

Database 120 may be a repository that may be written to and/or read by PIM program 110. In one embodiment, PIM program 110 may allow a user (e.g., a system owner) to define various privileged credentials for privileged users that are later synced, or stored, to database 120. In some embodiments, PIM program 110 may define various privileged credentials for privileged users that are later synced, or stored, to database 120. In other embodiments, database 120 may store various privileged credentials for privileged users that were previously used by the privileged users. In the depicted embodiment, database 120 resides on owner computing device 50. In other embodiments, database 120 may reside on another computing device or another server, provided that database 120 is accessible to PIM program 110 via network 20.

Web browser 130 may be a generic web browser used to retrieve, present, and negotiate information resources from the Internet. In some embodiments, web browser 130 may be a software program or application that enables a user at user computing device 60 to access PIM server 30 and managed server 40. In the depicted embodiment, web browser 130 resides on user computing device 60. In other embodiments, web browser 130 may reside on another computing device or server, provided that web browser 130 is capable of accessing PIM server 30 and managed server 40 via network 20.

Credential database 140 may be a repository that may be written to and/or read by PIM program 110. In one embodiment, PIM program 110 may allow a user (e.g., a system owner) to define various privileged credentials for privileged users and onboard the privileged credentials to credential database 140. In some embodiments, PIM program 110 may define various privileged credentials for privileged users and onboard the privileged credentials to credential database 140. In other embodiments, credential database 140 may store various privileged credentials for privileged users that were previously used by the privileged users. In the depicted embodiment, credential database 140 resides on PIM server 30. In other embodiments, credential database 140 may reside on another server or computing device, provided that credential database 140 is accessible to PIM program 110 via network 20.

Figure 2:
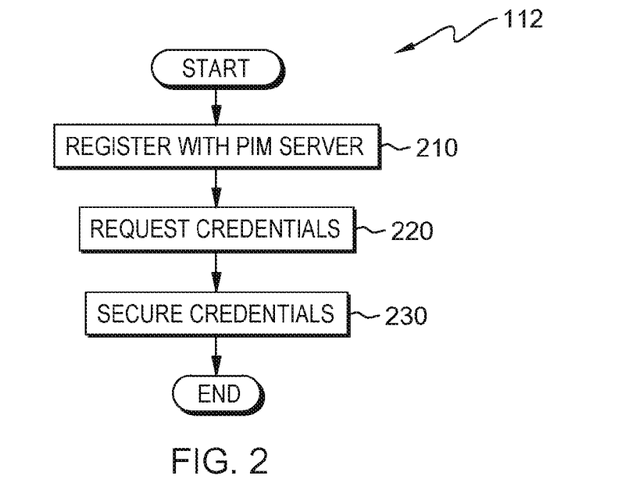
FIG. 2 depicts a flowchart of the steps of a sync function, executing within the computing system of FIG. 1, for synchronizing any updated credentials from PIM server 30, in accordance with an embodiment of the present invention.

FIG. 2 depicts a flowchart of the steps of a sync function, executing within the computing system of FIG. 1, in accordance with an embodiment of the present invention. Sync function 112 synchronizes any updated credentials from PIM server 30.

In step 210, sync function 112 registers with PIM server 30. During the registration process sync function 112 authenticates the use of the managed server 40 with the system owner's PIM credentials. The system owner's PIM credentials lets PIM server 30 know that the system owner actually has the right to use the managed server 40 in question. In one embodiment, sync function 112 receives an OAuth token from PIM server 30 that is cached on owner computing device 50 for future authentication. OAuth is an open standard for authorization. OAuth provides client applications a secure delegated access to server resources on behalf of a resource owner, specifying a process for resource owners to authorize third-party access to their server resources without sharing the resource owner's credentials. Designed to work with Hypertext Transfer Protocol (HTTP), OAuth allows access tokens to be issued to third-party clients by an authorization server, with the approval of the resource owner. In some embodiments, PIM server 30 requires from sync function 112 a second authentication factor, such as, a one-time password (OTP). An OTP is a password that is valid for only login session or transaction on a computer system or other digital device.

Sync function 112 may register different computing devices, up to as many as permitted by the system. When registering different computing devices, sync function 112 receives an OAuth token from PIM server 30 and caches it onto each computing device. Since each computing device would have an OAuth token issued by PIM server 30, each OAuth token on each computing device can be individually revoked from the PIM system by PIM server 30 or sync function 112.

In some embodiments, sync function 112 can be incorporated as an extended feature into an existing PIM client application that assists the user with automated check-out and single sign-on (SSO) to target systems. The extended feature will generally be made available to users of PIM program 110 who are system owners.

In step 220, sync function 112 requests credentials. Sync function 112 requests from PIM server 30 all the latest credentials owned by the system owner. In one embodiment, sync function 112 caches the requested credentials on owner computing device 50. In some embodiments, sync function 112 stores the requested credentials into a file on a disk on owner computing device 50. In other embodiments, sync function 112 stores the requested credentials onto some other storage device, such as a smartcard. Still, in some embodiments, sync function 112 stores the requested credentials to database 120.

In step 230, sync function 112 secures credentials. In one embodiment, sync function 112 uses encryption to secure the credentials. The credentials can be encrypted through various means. For example, the credentials can be encrypted with a random generated key that is in turn encrypted by a user's password, allowing only a user who knows the password to decrypt the credentials.

In some embodiments, once step 210 is complete, steps 220 and 230 run as a loop in a background thread on each system owner's machine to continually synchronize any updated credentials.

Figure 3:
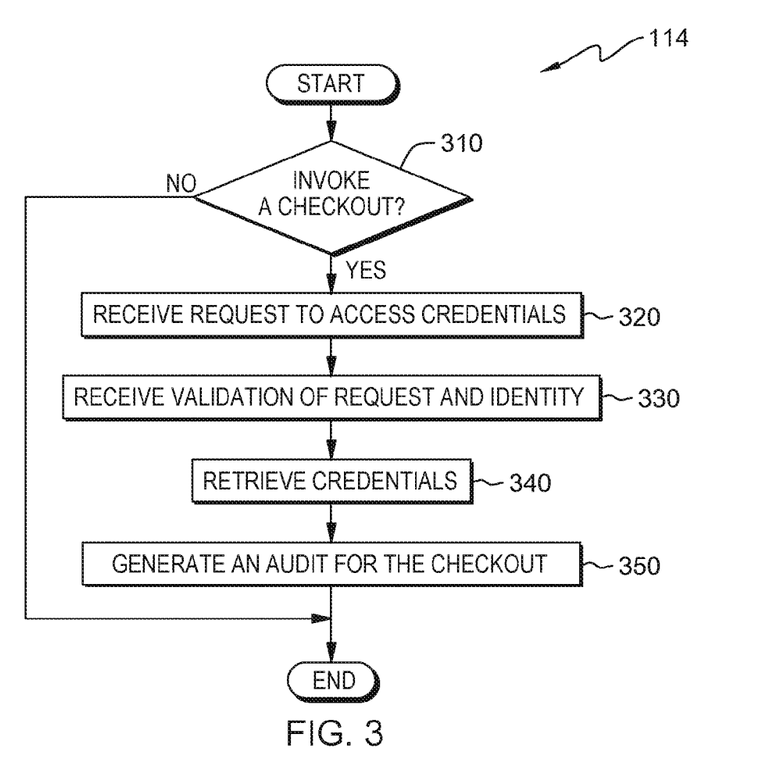
FIG. 3 depicts a flowchart of the steps of a checkout function, executing within the computing system of FIG. 1, for performing a checkout process on behalf of a user at a disconnected site, in accordance with an embodiment of the present invention.

FIG. 3 depicts a flowchart of the steps of a checkout function, executing within the computing system of FIG. 1, in accordance with an embodiment of the present invention. Checkout function 114 performs a checkout process on behalf of a user at a disconnected site.

In decision 310, the system owner, via checkout function 114, determines whether to invoke a checkout. Checkout function 114 determines whether to invoke a checkout based on whether a user is unable to checkout credentials from PIM server 30. Examples of when a user is unable to checkout credentials from PIM server 30 may include, but are not limited to: (1) PIM server 30 is down, and all system owners and users have no access to PIM server 30; (2) PIM server 30 is running and the system owner has access to PIM server 30, but many users have no access to PIM server 30 (usually due to regional network outages); and (3) PIM server 30 is running, but the system owner and users in a region cannot access PIM server 30 due to a regional network outage. If checkout function 114 determines to not invoke a checkout because a user is able to checkout credentials from PIM server 30 (decision 310, no branch), checkout function 114 ends. If checkout function 114 determines to invoke a checkout because a user is unable to checkout credentials from PIM server 30 (decision 310, yes branch), checkout function 114 receives a request to access credentials (step 320).

In step 320, checkout function 114 receives a request to access credentials from the system owner. In one embodiment, the user contacts the system owner via telephone, explaining to the system owner that the user is unable to checkout credentials from a PIM server and to request the system owner to retrieve the latest credentials for the user. The system owner checks out the credentials requested, on behalf of the requesting user, from PIM program 110 and conveys the credentials out-of-band to the user.

In step 330, checkout function 114 receives a validation of request and identity. In one embodiment, the system owner validates the user's request and identity and sends the validation to checkout function 114. For example, the system owner may validate the user's request and identity by contacting the user's manager. In other embodiments, a list of entitled users to each credential can be synced from PIM server 30 to database 120, so the system owner can countercheck if the requesting user is valid and pick from a drop-down list. In some embodiments, credentials can be synced to other personnel, e.g., the head of IT, etc., or temporarily delegated while the system owner is away. In the latter case, checkout function 114 can remove the credentials when the delegation period is over. Still, in other embodiments, if the user has a checkout function 114 installed on user computing device 60, this checkout function 114 can also sync information about who owns which system, so the user can query checkout function 114 to find out who is the system owner of the target system in case the user needs access when the user is unable to checkout credentials from PIM server 30.

In step 340, checkout function 114 retrieves credentials. The credentials being retrieved are the credentials necessary for the user to access the managed server 40. In one embodiment, the system owner, via checkout function 114, retrieves the requested credentials from database 120.

In step 350, checkout function 114 generates an audit for the checkout. In one embodiment, checkout function 114 prompts the system owner to enter the requesting user and justification for use of the system. Checkout function 114 generates an audit for the checkout and caches the audit, locally, for later submission. In other embodiments, the PIM administrator can search for, and review, such checkout events on a regular basis.

Figure 4:
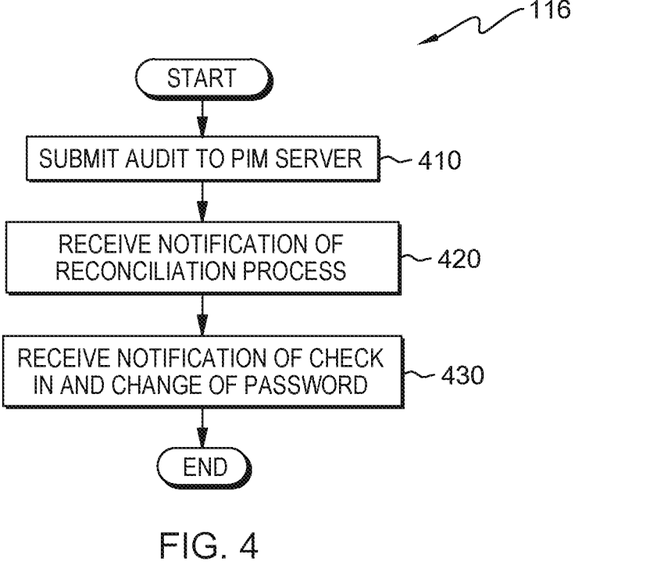
FIG. 4 depicts a flowchart of the steps of a reconciliation function, executing within the computing system of FIG. 1, for performing a post-checkout reconciliation process, which seeks to check in the credentials and change the password for future use, in accordance with an embodiment of the present invention.

FIG. 4 depicts a flowchart of the steps of a reconciliation function, executing within the computing system of FIG. 1, in accordance with an embodiment of the present invention. Reconciliation function 116 performs a post-checkout reconciliation process, which seeks to check in the credentials and change the password for future use.

In step 410, reconciliation function 116 submits audit to PIM server 30. In one embodiment, when the user is able to checkout credentials from PIM server 30 again and reconciliation function 116 regains connectivity to PIM server 30, reconciliation function 116 submits an audit log containing the checkouts to PIM server 30, which marks the credentials as checked out by the user. In some embodiments, when the user is able to checkout credentials from PIM server 30 again and reconciliation function 116 regains connectivity to PIM server 30, PIM server 30 automatically receives the audit log containing the checkouts and immediately marks the credentials as checked out by the user.

In step 420, reconciliation function 116 receives notification of the reconciliation process. The reconciliation process includes what needs to happen to make the system work as if the user was always able to checkout credentials from PIM server 30, i.e., checking in the credentials to make the system aware that the user is done. In one embodiment, PIM server 30 sends a notification to the system owner, the user, and reconciliation function 116, reminding the user to check in the credentials when the user is done and to let the user know of the earlier request in case someone tried to impersonate the user. In some embodiments, reconciliation function 116 sends a notification to the system owner and the user, reminding the user to check in the credentials when the user is done and to let the user know of the earlier request in case someone tried to impersonate the user.

In step 430, reconciliation function 116 receives notification of check in and change of password. In one embodiment, when the user is done with the credentials, the user logs on to the PIM server 30 to manually check in the credentials. In other embodiments, when the user is done with the credentials, reconciliation function 116 checks in the credentials to PIM server 30. In one embodiment, PIM server 30 automatically changes the password upon check in, so the user can no longer use the previous credentials. In some embodiments, PIM server 30 changes the password on a predetermined periodic basis. PIM server 30 sends a notification to reconciliation function 116 of the check in of credentials and change of password. Whenever the password is changed by PIM server 30, reconciliation function 116 is notified of the change and retrieves the latest credentials to store to database 120. Reconciliation function 116 communicates with PIM server 30 over HTTPS, which is a protocol for secure communication over a computer network that is widely used on the Internet. In some embodiments, reconciliation function 116 adopts various known means of tracking changes to PIM server 30, e.g., periodic polling, long polling, or newer HTTP-based push technologies, such as Websocket, Server-Sent Events, etc. In other embodiments, reconciliation function 116 tracks/receives credential updates from PIM server 30 via simple mail transfer protocol (SMTP) protocol. The PIM server 30 may send out updated credentials (encrypted with a key known only to owner's reconciliation function 116) over SMTP to user's corporate mailbox, and reconciliation function 116 may monitor incoming emails on the owner's email application, intercept from PIM server 30 to extract the credentials, and update the database 120.

In some embodiments, steps 410 through 430 run as a loop in a background thread on each system owner's machine as long as there are checkout events cached, pending submission to PIM server 30.

Figure 5:
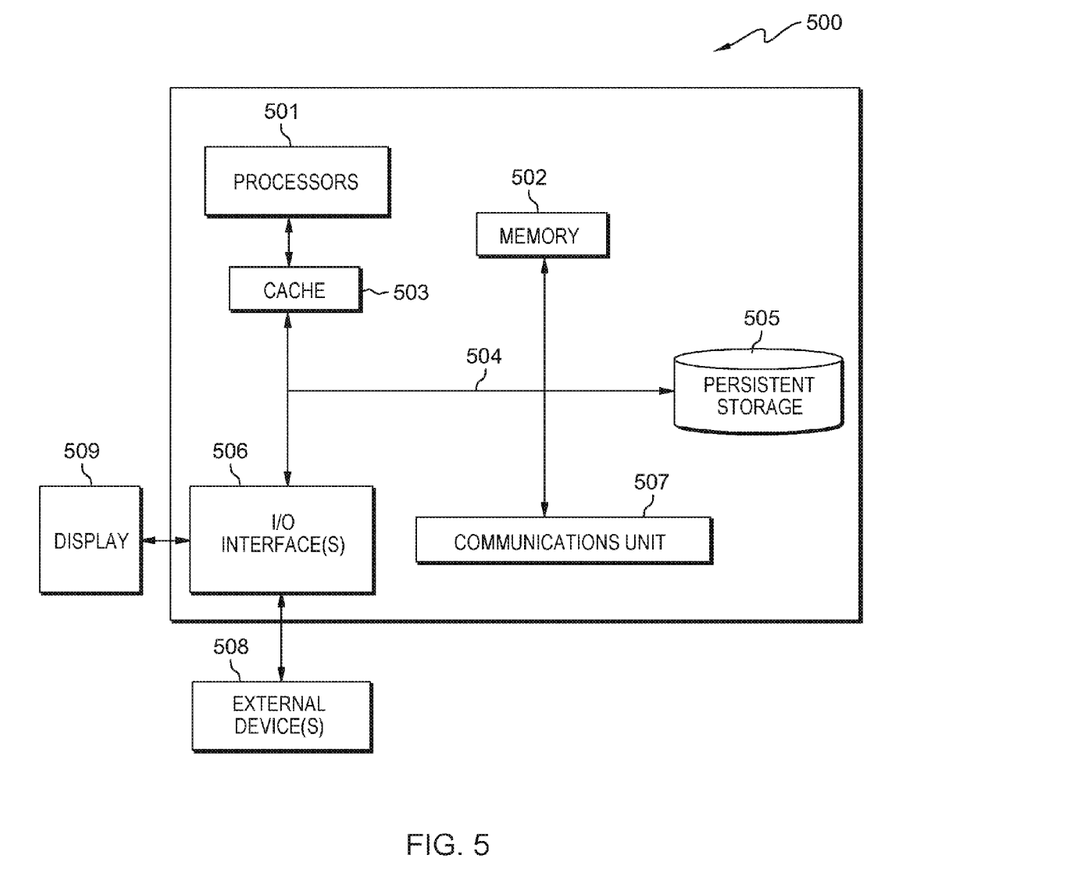
FIG. 5 depicts a block diagram of components of the servers and/or the computing device of FIG. 1, in accordance with an embodiment of the present invention.

FIG. 5 depicts computer system 500, which is an example of a system that includes components of PIM server 30, managed server 40, owner computing device 50, and/or user computing device 60. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507. Credential database 140 may be downloaded to persistent storage 505 of PIM server 30 through communications unit 507 of PIM server 30. PIM program 110, sync function 112, checkout function 114, reconciliation function 116, and database 120 may be downloaded to persistent storage 505 of owner computing device 50 through communications unit 507 of owner computing device 50. Web browser 130 may be downloaded to persistent storage 505 of user computing device 60 through communications unit 507 of user computing device 60.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., credential database 140, can be stored on such portable computer readable storage media and can be loaded onto persistent storage 505 of PIM server 30 via I/O interface(s) 506 of PIM server 30. Software and data used to practice embodiments of the present invention, e.g., PIM program 110, sync function 112, checkout function 114, reconciliation function 116, and database 120, can be stored on such portable computer readable storage media and can be loaded onto persistent storage 505 of owner computing device 50 via I/O interface(s) 506 of owner computing device 50. Software and data used to practice embodiments of the present invention, e.g., web browser 130, can be stored on such portable computer readable storage media and can be loaded onto persistent storage 505 of user computing device 60 via I/O interface(s) 506 of user computing device 60. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for providing auditable retrieval of privileged credentials in a privilege identity management (PIM) system, the computer program product comprising:
   one or more non-transitory computer readable storage media of a system owner computing device and program instructions stored on the one or more non-transitory computer readable storage media of the system owner computing device, the program instructions comprising:
   program instructions to register with a PIM server, wherein registering includes, at least, authenticating a use of a server with a plurality of PIM credentials of a system owner;
   program instructions to request an update to the plurality of PIM credentials owned by the system owner, wherein the requested plurality of PIM credentials are updated and synchronized from the PIM server to a database of the system owner;
   program instructions to secure the plurality of PIM credentials, wherein securing the plurality of PIM credentials comprises encrypting the plurality of PIM credentials;
   program instructions to invoke a checkout of a PIM credential on behalf of a user, based on, at least, a determination that the PIM server cannot be accessed, wherein the determination that the PIM server cannot be accessed is selected from the group consisting of the PIM server is down and a plurality of system owners, including, at least, the system owner, and a plurality of users, including, at least, a user, have no access to the PIM server, the PIM server is running and the system owner has access to the PIM server but the plurality of users have no access to the PIM server, and the PIM server is running but the system owner and the plurality of users in a region cannot access the PIM server due to a regional network outage;
   program instructions to receive a request to access the PIM credential by the user; program instructions to receive validation of the request to access the PIM credential and an identity of the user;
   program instructions to retrieve the PIM credential from the database, wherein the database stores a plurality of PIM credentials owned by a system owner;
   program instructions to generate an audit for the checkout, wherein the audit includes, at least, the user, the PIM credential, and a period of time;
   program instructions to submit the audit to the PIM server;
   program instructions to receive a notification of a reconciliation process, wherein the notification of the reconciliation process comprises generating a reminder to the user to check in the PIM credential when the user is done using the PIM credential and to indicate to the user an earlier request to access the PIM credential; and
   program instructions to receive a notification of the PIM credential being checked in and a change of password, wherein the change of password is updated and synced to the database.

* * * * *